United States Patent [19]  [11] Patent Number: 5,062,991
Siiman et al.  [45] Date of Patent: Nov. 5, 1991

[54] IN SITU USE OF GELATIN IN THE PREPARATION OF UNIFORM FERRITE PARTICLES

[75] Inventors: Olavi Siiman, Davie, Fla.; Alexander Burshteyn, Miami Lakes, both of Fla.

[73] Assignee: Coulter Corporation, Hialeah, Fla.

[21] Appl. No.: 532,434

[22] Filed: Jun. 4, 1990

[51] Int. Cl.$^5$ .................... B01J 13/02; C09D 5/23
[52] U.S. Cl. ...................... 252/315.2; 252/313.1; 252/309; 252/62.51; 427/213.35; 428/403
[58] Field of Search .............. 252/62.51, 62.53, 62.54, 252/313.1, 309, 315.2; 428/402, 403; 427/213.35

[56] References Cited

U.S. PATENT DOCUMENTS 4,965,007 10/1990 Yudelson ..................... 252/62.53

FOREIGN PATENT DOCUMENTS 8805337 7/1988 PCT Int'l Appl. .

OTHER PUBLICATIONS

R. Bendaoud et al., *Trans. On Magnetics*, MAG-23, 3869–3873 (1987).
T. Sugimoto et al., *J. Coll. Interface Sci.*, 74:227–243 (1980).
H. Tamura et al., *J. Coll. Interface Sci.*, 90:100 (1982).
A. Regazzoni et al., *Corrosion*, 38:212 (1982).
A. Regazzoni et al., *Colloids & Surfaces*, 6:189 (1983).
E. Matijevic, *J. Coll. & Interface Sci.*, 117:593 (1987).
P. H. Hess et al., *J. App. Poly Sci.*, 10:1915–1927 (1966).

Primary Examiner—Robert L. Stoll
Assistant Examiner—Greg M. Sweet
Attorney, Agent, or Firm—Myron C. Cass

[57] ABSTRACT

A method is described for the preparation of uniform colloidal particles of ferrites, containing manganese (II), zinc(II), barium(II), iron(II), cobalt(II), or nickel(II), or a mixture of manganese(II) and zinc(II), at a relatively low temperature in the presence of a gelatin solution which acts as a support vehicle for the nucleation and growth of colloidal particles of metal oxide and for dispersion as separate single particles.

13 Claims, 2 Drawing Sheets

IN SITU USE OF GELATIN IN THE PREPARATION OF UNIFORM FERRITE PARTICLES

FIELD OF THE INVENTION

This invention relates generally to a method for the preparation of metal oxide particles. More specifically, this invention is directed to an improved method for preparing uniform colloidal ferrite particles containing manganese(II), zinc(II), mixed manganese(II)-zinc(II), iron(II), barium(II), cobalt(II), or nickel(II). The particles of this invention are formed at a relatively low temperature in the presence of gelatin which acts as a vehicle for their nucleation and growth and for their dispersion into separate single particles of uniform size and shape.

BACKGROUND OF THE INVENTION

The invention is directed to overcoming the problem associated with obtaining well-dispersed colloidal particles of uniform size and shape of ferrites containing manganese(II), zinc(II), mixed manganese(II)-zinc(II), iron (II), barium(II), cobalt(II), and nickel(II). Colloidal particles of manganese(II) and zinc(II) or mixed manganese(II)-zinc(II) ferrites of uniform shape and size have not previously been reported. The invention provides a method of preparation of magnetic metal oxide particles in the presence of a polymer, solubilized in an aqueous medium wherein the colloidal particles of ferrites containing manganese(II), zinc(II), mixed manganese(II) -zinc(II), iron(II), barium(II), cobalt(II), and nickel(II), are of a well-defined and uniform shape and size and are dispersed as single particles in an aqueous media.

Ferrites containing manganese and/or zinc in fine particle form represent an important class of ferromagnetic materials. Most preparations of manganese ferrites have been carried out at high temperatures (1000°-2000° C.) from solid solutions to produce large crystallites [German Patent, DE 3619746 A1, Japanese Patents, JP 8791423 A2 and JP8791424 A2]. Lower temperature (350° C.) decomposition of a mixed Mn-Fe oxalate, followed by reduction with $H_2/H_2O$, gave a polycrystalline powder which was characterized as a solid solution of $Fe_3O_4$ and $MnFe_2O_4$. Low temperature methods assure crystallization of manganese ferrite in the spinel structure as ferrimagnetic fine particles [R. Bendaoud et.al., IEEE Trans. Magnetics, MAG-23: 3869-3873 (1987)].

Notable progress in obtaining monodispersed magnetite and ferrite ($Co^{2+}$, $Ni^{2+}$) particles has been made [T. Sugimoto and E. Matijevic, J. Coll. Interface Sci., 74: 227-243 (1980); H. Tamura and E. Matijevic, J. Coll. Interface Sci., 90: 100-109 (1982); A. E. Regazzoni and E. Matijevic, Corrosion, 38: 212-218 (1982); A. E. Regazzoni and E. Matijevic, Colloids Surf., 6: 189-201 (1983); E. Matijevic, J. Coll. Interface Sci., 117: 593-595 (1987); X. J. Fan and E. Matijevic, Patent Application WO 88/05337]. In every case, however, the bulk of the magnetic particles in suspension is irreversibly aggregated into large clusters that have a wide range of sizes and shapes. Also, the hydrophobic surface of bare metal oxide particles not only contributes to their agglomeration but also makes them unsuitable for manipulation in aqueous solutions of biological molecules, buffered near pH 7.

Some success in the preparation of polymer-magnetite composite particles of uniform spherical shape has been achieved through the emulsion polymerization of vinyl aromatic monomer in the presence of ferrofluid seed particles which become embedded inside the polymer latex [U.S. Pat. No. 4,358,388 and 4,783,336]. Control over the size of the magnetic latex particles is poor, therefore, resulting in particles with a wide range of sizes and magnetic content. When external surface carboxylic acid groups are introduced, the magnetic latex particles are hydrophilic to some degree but still cannot be dispersed as single particles in buffered aqueous media near pH 7. Coating of these particles by covalent attachment of aminodextran has been carried out to give the particles a hydrophilic shell. These aminodextran-coated particles are stable in an aqueous buffer and have been covalently linked with various monoclonal antibodies (IgG and IgM) for cell depletion.

Uniform polymer-ferrite or -maghemite (magnetic hemalite) composite particles have been prepared by crystallizing the magnetic oxide inside uniform spherical and porous polymer particles [International Patent Appliction WO83/03920; J Ughelstad et.al. in "Microspheres: Medical and Biological Applications", Eds., A. Rembaum and Z. A . Tokes, CRC Press, Inc., Boca Raton, FL, 1988]. Metal salts were diffused into the pores of the particle and adjustment of pH or oxidation was carried out as required. Alternatively, magnetic porous particles of metal oxide were first prepared and then, the pores were filled and covered with hydrophobic polymer. In both cases it was recognized that an additional hydrophilic polymer coating was required for better specific bead performance.

Solubilized polymers have been used to control the nucleation and growth of various metal particles. The concept of nucleation of metal particles in the domain of the polymer molecule was first described in the formation of cobalt organosols by thermal decomposition of dicobalt octacarbonyl in toluene and other organic solvents with various solubilized polymers [P. H. Hess and P. H. Parker, (Jr., J. Appl. Polym. Sci, 10: 1915-1927 (1966)]. The classic protective agent for colloids is gelatin ["The Theory of the Photographic Process", T. H. James, MacMillan Publ. of polyacrylic acid and polyethyleneimine-N-alkylacetic acid have been used to obtain stable hydrosols of gold, silver, copper, and platinum metals [H. Thiele and H. S. von Levern, J. Coll. Sci., 20: 679-694 (1965)]. Colloida dispersions of very small rhodium, iridium, osmium, palladium, platinum, silver, and gold particles in ethanol or methanol with polyvinyl alcohol (PVA) or polyvinylpyrrolidone (PVP) as stabilizer have been prepared [H. Hirai, J. Macromol. Sci. Chem., A12: 1117-1141 (1978); O. Siiman et.al., Chem. Phys. Lett., 100: 163-168 (1983); A. Lepp and O. Siiman, J. Coll. Interface Sci., 105: 325-341 (1985); O. Siiman and W. P. Hsu, J. Chem. Soc., Faraday Trans. 1, 82: 851-867 (1986)]. Functional, soluble polymers have been used to control the formation of colloidal dispersions of selenium and iron [T. W. Smith and R. A. Cheatham, Macromolecules, 13: 1203-1207 (1980); T. W. Smith and D. Wychick, J. Phys. Chem., 84: 1621-1629 (1980)].

Recently, hydroxypropyl cellulose was used in the formation and stabilization of monodisperse $TiO_2$ particles by hydrolysis of titanium tetraethoxide in ethanol [J. H. Jean and T. A. Ring, Colloids Surf., 29:273-291(1988)].

Monodispersed metal ferrite particles have several important applications. They have magnetic properties that are useful for the manufacture of transformers, inductors, audio and video recording heads. Gelatin-coated $MnFe_2O_4$ or $ZnFe_2O_4$ particles with attached monoclonal antibody represents a completely biodegradable magnetic separation system for biological cells. The particles, coating, and any attached monoclonal antibody can be phagocytosed without killing the cells. Also, gelatin, monoclonal antibody, and cell(s) may be separated from the magnetic particles by enzymatic cleavage of peptide bonds in gelatin, such as, by using trypsin, papain, collagenase and other digestive enzymes. The particles may, furthermore, be used as specific cell surface markers. This invention provides for effective preparation of such monodispersed metal ferrite particles.

SUMMARY OF THE INVENTION

In a method for the preparation of monodispersed colloidal particles of ferrites of manganese, zinc, mixed manganese-zinc, iron, barium, cobalt and nickel, an aqueous metal hydroxide gel is first formed by mixing ferrous and other metal salts in an aqueous gelatin solution with potassium or sodium hydroxide and potassium or sodium nitrate solution, all purged with nitrogen gas. The conversion of the gel to the metal oxide sol is achieved by mild thermal treatment at 90° C. (low temperature) for 4–72 hours, during which nitrate oxidation of ferrous iron occurs. This incubation period also serves to degrade the gelatin as noted by its lower viscosity. Only one type of gelatin, type B or alkali-cured, with a pI range of 4.75 to 5.0 was found optimal for in situ use.

DESCRIPTION OF PREFERRED EMBODIMENT

Figure 1:
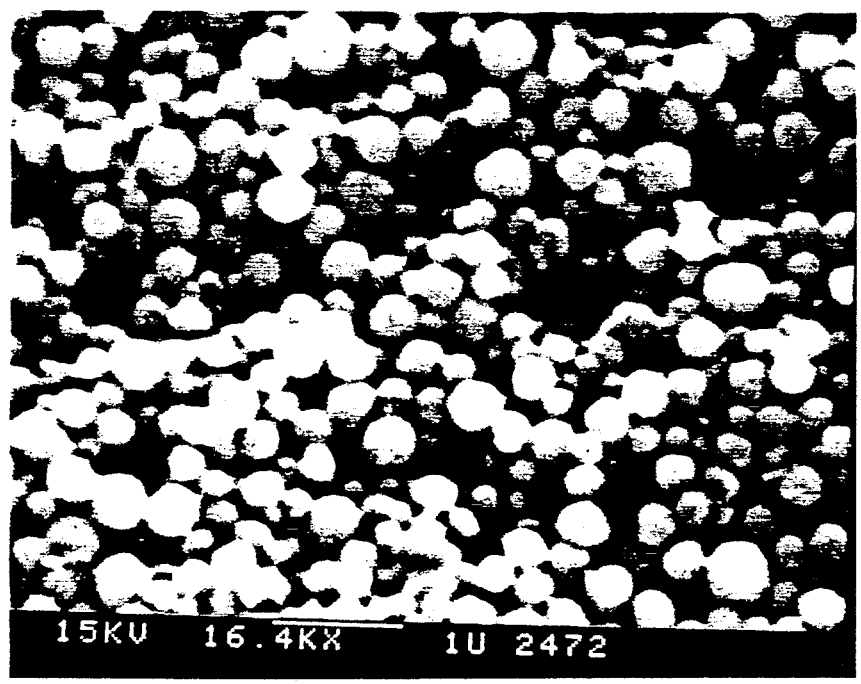
FIG. 1 is a scanning electron micrograph of manganese ferrite particles with white bar indicating a scale of 1 micron length.

Gelatin as a support vehicle for the formation of uniform metal oxide particles has several important roles. First, it serves as a buffer medium to neutralize acid, a product of the heat treatment. Second, gelatin molecules act as loci for the supersaturation of ferrite precursors and the formation and immobilization of ferrite nuclei. They also act as domains to restrict subsequent growth of nuclei and prevent the aggregation of particles. Various amino acid residues (asp, glu, lys, his, met) of gelatin can provide functional groups (carboxylate oxygen, amino nitrogen, imidazole nitrogen, thioether sulfur) through which parts of the reactant amorphous $Fe(OH)_2$ gel and its successors bind to gelatin. The alkali-cured gelatin, that is most successful in promoting the formation of single, uniform particles, contains an excess of carboxylic acid residues, useful in attachment to iron in the $Fe(OH)_2$ gel. Single particles of ferrites are then protected from aggregation by steric repulsion between adsorbed gelatin molecules. Gelatin can also adsorb to the hydrophobic surface of the product, the uncharged metal oxide particles, through its hydrocarbon residues, leaving its hydrophilic residues exposed to the solvent. In subsequent stabilization and use of the magnetic particles, gelatin usage allows chemical linkers to be used in fixing gelatin around particles to produce a stable composite from which gelatin can not be released by physical means. It also allows covalent coupling of a monoclonal antibody, an enzyme, or other proteins to the gelatin-coated particle. It is believed that no other polymer has been successfully substituted for gelatin in its aforementioned functions.

The choice of the metals for ferrite particle formation, involved two principles. Firstly, ferrimagnetic or superparamagneti particles were preferred over ferromagnetic ones in the size ranges, 0.1 to 1.0 $\mu$m in diameter. The former do not possess a permanent magnetic moment but do become magnetized in the presence of a magnetic field. In this way, aggregation possibilities created by the alignment of particle moments are avoided. It is known that ferrites, which have crystal structures of the normal spinel structure type, are ferrimagnetic [A. F. Wells, Structural Inorganic Chemistry, 5th ed., Clarendon Press, Oxford, 1984]. The requirement for the $M^{2+}$ metal ion to occupy tetrahedral sites in a normal spinel structure is that it gives no crystal field stabilization energy. Metal ion configurations $d^0$ ($Sr^{2+}$, $Ba^{2+}$) high-spin $d^5$ ($Mn^{2+}$), and $d^{10}$ ($Zn^{2+}$), satisfy this condition. Other metal ions ($Fe^{2+}$, $Co^{2+}$, $Ni^{2+}$) form inverse spinel structures in which $M^{2+}$ occupies octahedral sites, $Fe(MFe)O_4$, since these ions have significant octahedral crystal field stabilization energies. The designation "M" refers to a metal.

Secondly, the solubility of the $M(OH)_2$ species in water should be greater than that of $Fe(OH)_2$. Solubility products of representative metal hydroxides at 25° C. are as follows: $2.04 \times 10^{-13}$, Mn $(OH)_2$; $4.79 \times 10^{-17}$, Fe $(OH)_2$; $1.09 \times 10^{-15}$, $Co(OH)_2$; $5.54 \times 10^{-16}$, $Ni(OH)_2$; $7.68 \times 10^{-17}$, $Zn(OH)_2$ [Handbook of Chemistry and Physics, 64th ed., CRC Press, Boca Raton, FL, 1984, p. B-219]. A value of $Ksp(M(OH)_2) > Ksp(Fe(OH)_2)$ is required so that some $M^{2+}$ will dissolve in aqueous solution and be able to diffuse through the $Fe(OH)_2$ gel and substitute for some of the $FE^{2+}$ ions. Thus, the more soluble $Mm(OH)_2$, $Co(OH)_2$, and $NI(OH)_2$ give uniform, submicron ferrite particles in our preparative procedure. The cobalt and nickel ferrites showed clustering of particles similar to that of ferromagnetic magnetite particles after multiple washings and magnetic separations. Ferrimagnetic manganese, zinc, and mixed manganese-zinc ferrites showed little or no tendency to aggregate. Also, $Zn(OH)_2$ is almost as insoluble as $Fe(OH)_2$ and $Zn(OH)_2$ is amphoteric, so that stable zincate ions, $ZnO_2^{2-}$ are formed in basic solution. Very small amounts of magnetic material were obtained by this procedure with zinc. However, a 1:1 manganese-to-zinc sulfate mixture gave uniform magnetic ferrite particles in good yield. In addition, $Ba^{2+}$, which forms a very soluble hydroxide produced uniform submicron magnetic ferrite particles.

The following solutions of reagent grade metal salts in double distilled water (DDW) were prepared: 5M KOH, 2M $KNO_3$, 1M $FeSO_4$, 1M $MnSO_4$, 0.25M $ZnSO_4$, 1M $Co(NO_3)_2$, 1M $Ni(NO_3)_2$, 0.1M $Ba(NO_3)_2$, and 1M $FeCl_2$. All stock solutions except the KOH solution, were filtered through 0.2 $\mu$m cellulose nitrate filters. The $FeSO_4$ and $FeCl_2$ solutions were purged with nitrogen gas for 10 minutes each time they were used and not stored for more than one week. Gelatin, type B, 225 Bloom, bovine skin, was prepared freshly as a 2% solution in double distilled water and purged with nitrogen gas for 10 minutes.

EXAMPLE 1

PREPARATION OF MAGNETITE PARTICLES 10 mmol $KNO_3$ (5mL) solution, 12.5 mmol KOH (2.5mL) solution, and 11.25mL DDW were mixed and purged with $N_2$ gas for 10 minutes (solution A). 6.25 mmol $FeSO_4$ (6.25 mL) solution and 25 mL 2% gelatin solution was then added to solution A in a Pyrex bottle, mixed, swept with $N_2$ gas, capped tightly, and placed undisturbed in oven at 90° C. for 4 hours. After the suspension of black magnetite particles had reached room temperature, it was sonicated for ½ hour and the particles were then washed 5 times 1% gelatin solution by magnetic separation and redispersion in gelatin solution. The suspension was sonicated for 5 minutes between each wash.

Microscopic examination of the particles at 1000× magnification showed almost exclusively single, spherical particles of about 0.5 μm diameter. If the molar ratio of $Fe^{2+}$ $OH^{-1}$ was changed from 1:2 to 1:1 by using 6.25 mmol KOH (1.25 mL) in the procedure, then similar black magnetite particles aggregated into small clusters with some single particles were obtained. When the $KNO_3$ solution was pre-mixed with the $FeSO_4$ solution and other steps were unchanged, very small reddish-brown particles in stringy aggregates were produced. Therefore, the first procedure was adopted as the standard one in subsequent experiments.

Other types of gelatin such as type B, 60 Bloom; type A, 175 Bloom; and type A, 300 Bloom did not perform. More and larger aggregates of magnetite particles were formed in each case. Various PVA polymers in molecular weight (MW) range 3,000 to 106,000 gave irregular large black aggregates of magnetite particles which could not be dispersed. Similar results were observed with polyacry (5–6 ×106, MW) and sodium dodecyl sulfate. Polyacrylic acid (2K and 5K MW) and dextran (100K and 500K MW) gave large brown crystallites which were only weakly magnetic; whereas, polyacrylic acid and dextran of higher molecular weight gave no magnetic material. Also, polystyrene sulfonic acid, PVP, and sulfonated casing gave no magnetic material.

EXAMPLE 2

PREPARATION OF METAL FERRITES

In trials with other metals, namely, $Mn^{2+}$, $Zn^2$, $Co^{2+}$, $Ni^{2+}$, and ($M^{2+}$), the molar ratio of $M^{2+}$:$Fe^{2+}$ was kept at 1:2 but nitrate instead of sulfate salts of $Co^{2+}$ and $Ni^{2+}$ were used. The total metal-to-hydroxide molar ratio was maintained at 1:2; but, the relative $KNO_3$ to total metal and $KNO_3$ to KOH molar ratios were altered. In preparing the mixed Mn-Zn ferrite, a 1:1 molar ratio of manganese sulfate to zinc sulfate and the same total molar amount of non-ferrous metal ions were used.

10 mmol $KNO_3$ (5 mL) solution, 18.75 mmol KOH (3.75 mL), and 6.875 mL DDW were mixed and purged with $N_2$ gas for 10 minutes (solution C). 6.25 mmol $FeSO_4$ (6.25 mL) solution, 3.125 mmol $Co(NO_3)_2$ (3.125 mL) solution, and 25 mL 2% gelatin solution were mixed and purged with $N_2$ gas for 10 minutes (solution D). Solution D was added to solution C in a Pyrex bottle, mixed, swept with $N_2$ gas, capped tightly, and placed undisturbed in an oven at 90° C. for 5 hours. After the suspension of brown particles had reached room temperature, it was sonicated for ½ hour and the particles were then washed 5× with 1% gelatin solution by magnetic separation and redispersion in gelatin solution. The suspension was sonicated for 5 minutes between each wash.

Cobalt and nickel ferrite particles of about 0.1 and 0.2 μm in diameter and of spherical shape were formed in large, loosely-held brown aggregates. Zinc gave low yields of light brown magnetic material (<0.2 μm diameter) even after 72 hours of heat treatment. Dark brown manganese ferrite particles of uniform, spherical shape and 0.3 μm diameter were obtained as single particles in 83–88% yields. Similar light brown manganese-zinc ferrite particles were produced in 49–55% yield after 72 hours of heat treatment at 90° C. For barium, the procedure had to be modified since $BaSO_4$ is insoluble in water. Thus, 6.25 mmol $FeCl_2$ (6.25 mL) solution, 0.5 mmol $Ba(NO_3)_2$ (5.0 mL) solution, and 25 mL 2% gelatin solution were mixed and purged with $N_2$ gas for 10 minutes (solution D). Solution C and the remainder of the ferrite preparation procedure was unchanged except 10 mmol KOH solution (2 mL) was used and the heat treatment was continued for 20 hours. Black barium ferrite particles of uniform non-spherical shape with a 0.2 μm diameter were produced.

Figure 2:
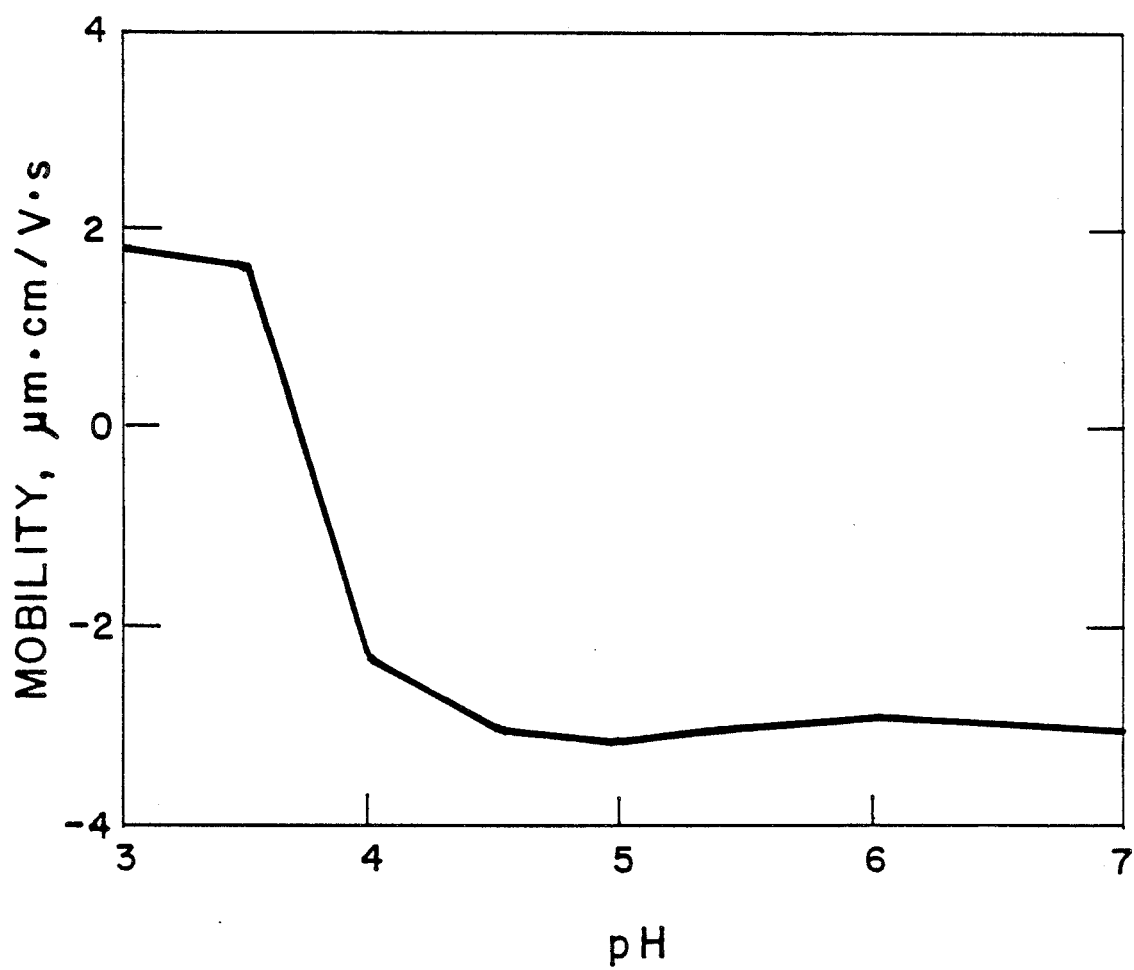
FIG. 2 is a graph of mobility versus pH for bare manganese ferrite particles in 1 mM aqueous sodium nitrate suspension at 25° C.

Because of their favorable magnetic, size, and shape properties, manganese ferrite particles were also prepared at larger scales and analyzed further by physical means. Concentrations of reactants were scaled up linearly at 250 and 500 mL total levels. For the 250 mL-scale, the heat treatment at 90° C. was still for 5 hours, but it was increased to 48 hr to achieve better gel-to-sol conversion on the 500 mL scale. Percentage yields based on a 2:1 molar ratio of $FeSO_4$ : $MnFe_2O_4$ were 83% at the 250 mL scale 204 were and 84% at the 500 mL scale. The particles were washed exhaustively with DDW and then dried at 110° C. and weighed to constant weight. Elemental analyses were obtained on a 250 mL scale preparation as follows: Calculated for $MnFe_2O_4$: Mn, 23.82%; Fe, 48.43%; observed: Mn, 20.01%; Fe, 49.99%. Duplicate pycnometer measurements of density for manganese ferrite particles by displacement of DDW gave 4.24 and 4.23 g/cc. A scanning electron micrograph (FIG. 1) of manganese ferrite particles showed particles of spherical shape and uniform size. The mean diameter for 414 particles was 0.29(0.08)μm. The specific surface ($S_w$) for manganese ferrite particles is then 4.89 m²/g. This compares favorably with magnetite embedded polystyrene latex beads as follows: (1) 0.7 μm, 41% magnetite, 1.56 g/cc gives $S_w$=5.50 m²/g; (2) 0.98 μm, 23% magnetite, 1.28 g/cc gives 4.78 m²/g. The most recent porous ferrite hydrophobic polymer-filled and covered beads give an $S_w$ range of 3–5 m²/g. The electrophoretic mobility of bare manganese ferrite particles in 1 mM aqueous nitrate at 25° C., measured as a function of pH (adjusted with aqueous sodium hydroxide or nitric acid) on the Coulter DELSA 440, is shown in FIG. 2. An isoelectric point of about 3.7 for the colloidal particles and a zeta potential of −65 mV at pH7 was obtained.

Elemental analyses were also obtained for manganese-zinc ferrite: calculated for $Mn_{0.5} Zn_{0.5} Fe_2O_4$: Mn, 11.65% Zn, 13.86%; Fe, 47.36%; observed: Mn, 10.86%; Zn, 11.61%; Fe, 47.12%. The density of manganese-zinc ferrite particles was 4.13 and 4.20 g/cc in duplicate measurements. The specific surface for manganese-zinc ferrite particles is 4.97 m²/g.

The method embodying the invention contemplates substituting a mixture of sodium hydroxide and sodium nitrate for the potassium hydroxide and potassium nitrate mixture. Also, divalent metal nitrates, i.e., of $Co^{2+}$, $Ni^{2+}$, $Zn^{2+}$ and $Ba^{2+}$ can be replaced by divalent metal chlorides and divalent metal sulfates except for the divalent metal $Ba^{2+}$ which will form an insoluble barium sulfate compound. The divalent metal sulfates of $Mn^{2+}$, $Zn^{2+}$, and $Fe^{2+}$ can be replaced by divalent metal chlorides and nitrates except for ferrous nitrate which is unstable because of subsequent oxidation to form ferric nitrate.

The relatively low temperature employed in practicing the invention can vary in the range of 85°–95° C. Also, the time period for nitrogen gas purging may be varied within appropriate limits without adversely affecting practicing the invention. Also, the percentage rating of the gelatin solution may vary within the approximate range of 0.8% to 2.0%.

The colloidal particles prepared by the herein invention are monodisperse with a ferrite structure and a mean particle diameter of approximately 0.1 to 1.0 microns. The Mn(II) ferrite particles contain approximately 17 to 21 percent by weight of manganous ions. The Mn(II), Zn(II), mixed Mn(II)-Zn(II) and Ba(II) ferrite particles have a ferrimagnetic response to a magnetic field, i.e., possess no magnetic memory, while magnetite and Co(II) and Ni(II) ferrite particles have a ferromagnetic response.

The Mn(II) and mixed Mn(II)-Zn(II) particles have a significantly lower density of 4.2 g/cc than 2 g/cc density of the magnetite particles whereby submicron particles are made more buoyant in aqueous suspensions.

The Mn(II), Zn(II) and mixed Mn(II)-Zn(II) particles have surfaces which are less hydrophobic than the surfaces of magnetite particles which have an isoelectric point of 6.7 as compared to the isoelectric point of 3.7 of Mn(II) ferrite particles. The Mn(II) ferrite particles are more stable in aqueous suspension in proximity to pH7 due to electrostatic repulsion between negatively charged particles. The Mn(II) and mixed Mn(II)-Zn(II) ferrite particles have a high specific surface of $5m^2/g$.

I claim:

1. A method of making colloidal ferrite particles of uniform size and shape comprising:
   A. mixing a first solution of potassium nitrate and potassium hydroxide or sodium nitrate and sodium hydroxide, respectively, which has been nitrogen gas purged and a
   B. second solution of a ferrous salt, divalent metal salt and a gelatin solution which second solution has been nitrogen purged;
   C. sweeping the gelatinous metal hydroxide mixture of the two solutions with nitrogen gas and ripening same to form a ferrite hydrosol at a predetermined low temperature for a selected period of time;
   D. washing the hydrosol with said gelatin solution by magnetic separation and redispersion,
   whereby to form separate single metal ferrite particles coated with gelatin.

2. The method of claim 1 in which the metal ion of said divalent metal salt is the $Fe^{2+}$ ion.

3. The method of claim 2 in which said ferrous salt can be either a chloride or sulfate salt.

4. The method of claim 1 in which the metal ion of said divalent metal salt is selected from the group consisting of $Mn^{2+}$, $Co^{2+}$, $Ni^{2+}$ and $Zn^{2+}$ ions.

5. The method of claim 1 in which the metal ion of said divalent metal salt is selected from the mixed group of $Mn^{2+}$ and $Zn^{2+}$ ions.

6. The method of claim 4 in which said divalent metal salt is selected from the group consisting of a metal chloride, metal sulfate and metal nitrate salt.

7. The method of claim 5 in which said divalent metal salt is selected from a mixture of metal chloride, metal sulfate and metal nitrate salts.

8. The method of claim 6 in which said ferrous salt can be either a chloride or sulfate salt.

9. The method of claim 1 in which the divalent metal salt is selected from the group consisting of barium nitrate and barium chloride and the ferrous salt comprises ferrous chloride.

10. A colloidal ferrite particle produced by the method of claims 1 or 2.

11. Colloidal particles which are monodispersed having a ferrite structure and a mean particle diameter of approximately 0.1 to 1.0 microns, said particles including a divalent metal ion selected from the group consisting of manganese(II), zinc(II), mixed Mn(II)-Zn(II), iron(II), barium(II.), cobalt(II) and nickel(II) and characterized as being well-defined and of uniform size and shape.

12. The colloidal particles of claim 11 in which ferrite particles of manganese(II), zinc(ID, mixed manganese(II)-zinc(II) and barium(II) display a ferrimagnetic response to a magnetic field.

13. The colloidal particles of claim 11 in which the ferrite particles of iron(II), cobalt(II) and nickel(II) display a ferromagnetic response to a magnetic field.

* * * * *

UNITED STATES PATENT AND TRADEMARK OFFICE
CERTIFICATE OF CORRECTION

PATENT NO. : 5,062,991
DATED : November 5, 1991
INVENTOR(S) : Olavi Siiman and Alexander Burchteyn It is certified that error appears in the above-identified patent and that said Letters Patent is hereby corrected as shown below:

Col. 1, line 38 and 39, change "ferromagnetic" to

--ferrimagnetic--;

Column 1, line 60, after "E. Matijevic," add --J. Am.

Ceram. Soc., 71; C-60-C-62(1988); International--;

Column 1, line 55, change "MatiJevic" to --Matijevic--;

Column 2, line 45, after "MacMillan Publ." add --Co.,

New York, 1977]. Other agents such as the hydrazide--;

Column 2, line 49, change "Colloida" to --Colloidal--;

Column 4, line 40, change "$FE^{2+}$" to --$Fe^{2+}$--;

Col. 4, line 41, change "$ZnO_2^{2-}$are" to --$ZnO_2^{2-}$ are--.

Column 4, line 41, change "$ZnO22-$" to --$ZnO_2^{2-}$--;

Column 4, line 54, change "yieId" to --yield--;

Column 5, line 20, after "$Fe^{2+}$" add -- :--;

Column 5, line 36, change "polyacry" to --polyacrylamide--;

Column 5, line 42, change "casing" to --casein--;

Column 5, line 48, change "$M2^+$" to --$M^{2+}$--;

UNITED STATES PATENT AND TRADEMARK OFFICE
CERTIFICATE OF CORRECTION

PATENT NO. : 5,062,991

DATED : November 5, 1991

INVENTOR(S) : Olavi Siiman and Alexander Burchteyn

It is certified that error appears in the above-identified patent and that said Letters Patent is hereby corrected as shown below:

Column 6, line 28, after "total" add --volume--;

Column 6, line 33, delete "204 were";

Column 6, line 61, change "$ZN_{0.5}$" to --$Zn_{0.5}$--;

Column 7, line 3, change "$NiZ^+$, $ZnZ^+$ and $Ba2^+$" to --$Ni^{2+}$, $Zn^{2+}$ and $Ba^{2+}$--;

Column 7, line 5, change "$Ba2^+$" to --$Ba^{2+}$--;

Column 7, line 7, change "$Fe2^+$" to --$Fe^{2+}$--;

Col. 7, line 32, change "4.2 g/cc than 2 g/cc" to --4.2g/cc than the 5.2g/cc--.

Column 8, line 13, change "$Fe2^+$ion." to --$Fe^{2+}$ ion.--;

UNITED STATES PATENT AND TRADEMARK OFFICE
CERTIFICATE OF CORRECTION

PATENT NO. : 5,062,991

DATED : November 5, 1991

INVENTOR(S) : Olavi Siiman and Alexander Burchteyn

It is certified that error appears in the above-identified patent and that said Letters Patent is hereby corrected as shown below:

Column 8, line 18, change "$Mr^{2+}$, $Co2^{+}$, $Ni2^{+}$ and $Zn2^{+}$ ions" to --$Mn^{2+}$, $Co^{2+}$, $Ni^{2+}$ and $Zn^{2+}$ ions.--;

Column 8, line 21, change "$Mn2^{+}$ and $Zn2^{+}$ ions." to --$Mn^{2+}$ and $Zn^{2+}$ ions.--;

Col. 8, line 45, change "zinc(ID)" to --zinc(II)--.

Signed and Sealed this

First Day of June, 1993

Attest:

MICHAEL K. KIRK

Attesting Officer    Acting Commissioner of Patents and Trademarks